United States Patent
Menheere (10) Patent No.: US 12,215,630 B2
(45) Date of Patent: Feb. 4, 2025

(54) FLEX COUPLER FOR HYBRID GAS TURBINE ENGINE POWERPLANT

(71) Applicant: Pratt & Whitney Canada Corp., Longueuil (CA)

(72) Inventor: David Menheere, Norval (CA)

(73) Assignee: Pratt & Whitney Canada Corp., Longueuil (CA)

( * ) Notice: Subject to any disclaimer, the term of this patent is extended or adjusted under 35 U.S.C. 154(b) by 81 days.

(21) Appl. No.: 18/088,202

(22) Filed: Dec. 23, 2022

(65) Prior Publication Data
US 2024/0209794 A1  Jun. 27, 2024

(51) Int. Cl.
| | | |
|---|---|---|
| *F02C 7/36* | (2006.01) | |
| *B64D 27/10* | (2006.01) | |
| *B64D 27/24* | (2024.01) | |
| *F02C 6/20* | (2006.01) | |
| *F02C 7/32* | (2006.01) | |

(52) U.S. Cl.
CPC ............... *F02C 7/36* (2013.01); *B64D 27/10* (2013.01); *B64D 27/24* (2013.01); *F02C 6/20* (2013.01); *F02C 7/32* (2013.01); *F05D 2220/323* (2013.01); *F05D 2220/70* (2013.01); *F05D 2240/62* (2013.01); *F05D 2260/40* (2013.01)

(58) Field of Classification Search
CPC ..... F16D 3/10; F16D 3/48; F16D 3/50; F16D 3/70; F16D 3/78
See application file for complete search history.

(56) References Cited

U.S. PATENT DOCUMENTS

| | | | | |
|---|---|---|---|---|
| 1,575,927 | A * | 3/1926 | Morse | F16D 3/78 |
| | | | | 464/94 |
| 1,691,116 | A * | 11/1928 | Jencick | F16D 3/78 |
| | | | | 464/94 |
| 2,386,017 | A * | 10/1945 | Venditty | F16D 3/50 |
| | | | | 464/100 |
| 4,282,723 | A * | 8/1981 | Schmidt | F16D 3/78 |
| | | | | 464/93 |
| 4,317,339 | A * | 3/1982 | Schmidt | F16D 3/78 |
| | | | | 464/69 |
| 7,546,742 | B2 | 6/2009 | Wakeman | |
| 9,938,853 | B2 | 4/2018 | Gemin | |

(Continued)

OTHER PUBLICATIONS

EP Search Report for EP Patent Application No. 23219893.7 dated May 24, 2024.

*Primary Examiner* — David P. Olynick
(74) *Attorney, Agent, or Firm* — Getz Balich LLC (57) ABSTRACT

An engine system is provided that includes an engine rotating structure, an electric machine rotating structure and a flex coupler. The flex coupler rotatably connects the electric machine rotating structure to the engine rotating structure. The flex coupler includes a first mount, a second mount and a flex plate. The first mount includes a plurality of first mount fingers arranged circumferentially about an axis. The second mount includes a plurality of second mount fingers arranged circumferentially about the axis. The flex plate connects the first mount to the second mount. The flex plate includes a plurality of first flex plate fingers and a plurality of second flex plate fingers. Each of the first flex plate fingers is attached to a respective one of the first mount fingers. Each of the second flex plate fingers is attached to a respective one of the second mount fingers.

18 Claims, 10 Drawing Sheets

(56) References Cited

U.S. PATENT DOCUMENTS

| | | |
|---|---|---|
| 10,487,839 B2 | 11/2019 | Kupiszewski |
| 10,693,403 B2 | 6/2020 | Zhang |
| 2019/0085715 A1 | 3/2019 | Van Der Merwe |
| 2021/0010382 A1 | 1/2021 | Davies |
| 2021/0010383 A1 | 1/2021 | Bradley |
| 2021/0010384 A1 | 1/2021 | Bradley |
| 2021/0079850 A1 | 3/2021 | Davies |
| 2021/0317781 A1 | 10/2021 | Sethi |
| 2023/0358229 A1* | 11/2023 | Nicholas ............... F04C 18/023 |

* cited by examiner

FLEX COUPLER FOR HYBRID GAS TURBINE ENGINE POWERPLANT

TECHNICAL FIELD

This disclosure relates generally to a hybrid powerplant and, more particularly, to coupling an electric machine with a gas turbine engine.

BACKGROUND INFORMATION

A hybrid powerplant for an aircraft may include a gas turbine engine and an electric motor. The gas turbine engine and the electric motor may be operatively connected in parallel through a gearbox or inline through a shaft and/or another coupling. Various types and configurations of hybrid powerplants are known in the art. While these known hybrid powerplants have various benefits, there is still room in the art for improvement.

SUMMARY

According to an aspect of the present disclosure, an engine system is provided that includes a gas turbine engine, an electric machine and a flex coupler. The gas turbine engine includes an engine rotating structure, a compressor section, a combustor section, a turbine section and a flowpath extending through the compressor section, the combustor section and the turbine section. The engine rotating structure includes a turbine rotor within the turbine section. The electric machine includes an electric machine rotating structure. The flex coupler rotatably connects the electric machine rotating structure to the engine rotating structure. The flex coupler includes a first mount, a second mount and a flex plate. The first mount includes a plurality of first mount fingers arranged circumferentially about an axis. The second mount includes a plurality of second mount fingers arranged circumferentially about the axis. The flex plate connects the first mount to the second mount. The flex plate includes a plurality of first flex plate fingers and a plurality of second flex plate fingers. Each of the first flex plate fingers is attached to a respective one of the first mount fingers. Each of the second flex plate fingers is attached to a respective one of the second mount fingers.

According to another aspect of the present disclosure, another engine system is provided that includes a propulsor rotor, an electric machine and a drivetrain. The electric machine includes an electric machine rotating structure. The drivetrain is configured to transfer mechanical power between the electric machine rotating structure and the propulsor rotor. The drivetrain includes a flex coupler. The flex coupler includes a first mount, a second mount and a flex plate. The first mount includes a plurality of first mount fingers arranged circumferentially about an axis. The second mount includes a plurality of second mount fingers arranged circumferentially about the axis. The flex plate connects the first mount to the second mount. The flex plate includes a plurality of first flex plate fingers and a plurality of second flex plate fingers. Each of the first flex plate fingers is attached to a respective one of the first mount fingers. Each of the second flex plate fingers is attached to a respective one of the second mount fingers.

According to still another aspect of the present disclosure, another engine system is provided that includes a gas turbine engine, an electric machine and a flex coupler. The gas turbine engine includes an engine rotating structure, a compressor section, a combustor section, a turbine section and a flowpath extending through the compressor section, the combustor section and the turbine section. The engine rotating structure includes a turbine rotor within the turbine section. The electric machine includes an electric machine rotating structure. The flex coupler rotatably connects the electric machine rotating structure to the engine rotating structure. The flex coupler includes a hub, a sleeve and a polymer coupler. The hub is rotatable about an axis. The hub is coupled to one of the electric machine rotating structure or the engine rotating structure. The sleeve circumscribes the hub. The sleeve is coupled to the other one of the electric machine rotating structure or the engine rotating structure. The polymer coupler is radially between and rotatably fixed to the hub and the sleeve.

The flex coupler may provide an axial slip joint between the electric machine rotating structure and the engine rotating structure.

The engine system may also include a gas turbine engine, and the gas turbine engine may include an engine rotating structure. The drivetrain may rotatably connect the electric machine rotating structure to the engine rotating structure.

The flex coupler may be configured to accommodate axial shifting between the engine rotating structure and the electric machine rotating structure.

The flex coupler may be configured to accommodate misalignment between a rotational axis of the engine rotating structure and a rotational axis of the electric machine rotating structure.

The first flex plate fingers may be interspersed with the second flex plate fingers circumferentially about the axis.

Each of the first flex plate fingers may be arranged circumferentially between a respective circumferentially adjacent pair of the second flex plate fingers.

Each of the second flex plate fingers may be arranged circumferentially between a respective circumferentially adjacent pair of the first flex plate fingers.

The first mount may also include a first mount base. Each of the first mount fingers may project radially out from the first mount base to a respective first mount finger distal end. Each of the first mount fingers may be attached to the respective one of the first flex plate fingers at the respective first mount finger distal end.

Each of the first mount fingers may also project axially out from the first mount base towards the respective first mount finger distal end.

The flex plate may also include a flex plate base. Each of the first flex plate fingers may project radially out from the flex plate base to a respective first flex plate finger distal end. Each of the first flex plate fingers may be attached to the respective one of the first mount fingers at the respective first flex plate finger distal end. Each of the second flex plate fingers may project radially out from the flex plate base to a respective second flex plate finger distal end. Each of the second flex plate fingers may be attached to the respective one of the second mount fingers at the respective second flex plate finger distal end.

Each of the first mount fingers may have a minimum first mount finger thickness. Each of the first flex plate fingers may have a minimum first flex plate finger thickness that is less than the minimum first mount finger thickness.

Each of the first flex plate fingers may be attached to the respective one of the first mount fingers by a respective first fastener. Each of the second flex plate fingers may be attached to the respective one of the second mount fingers by a respective second fastener.

The engine system may also include a driveshaft rotatably connecting the flex coupler to one of the electric machine rotating structure or the engine rotating structure.

The engine system may also include a second flex coupler rotatably connecting the driveshaft to the electric machine rotating structure. The flex coupler may include a first flex coupler that rotatably connects the driveshaft to the engine rotating structure. The second flex coupler may have a different configuration than the first flex coupler.

The engine system may also include a second flex coupler rotatably connecting the driveshaft to the electric machine rotating structure. The flex coupler may include a first flex coupler that rotatably connects the driveshaft to the engine rotating structure. The second flex coupler may have a common configuration with the first flex coupler.

The flex coupler may be directly attached to at least one of the engine rotating structure or the electric machine rotating structure.

The engine system may also include a propulsor rotor rotatably connected to the engine rotating structure and the electric machine rotating structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
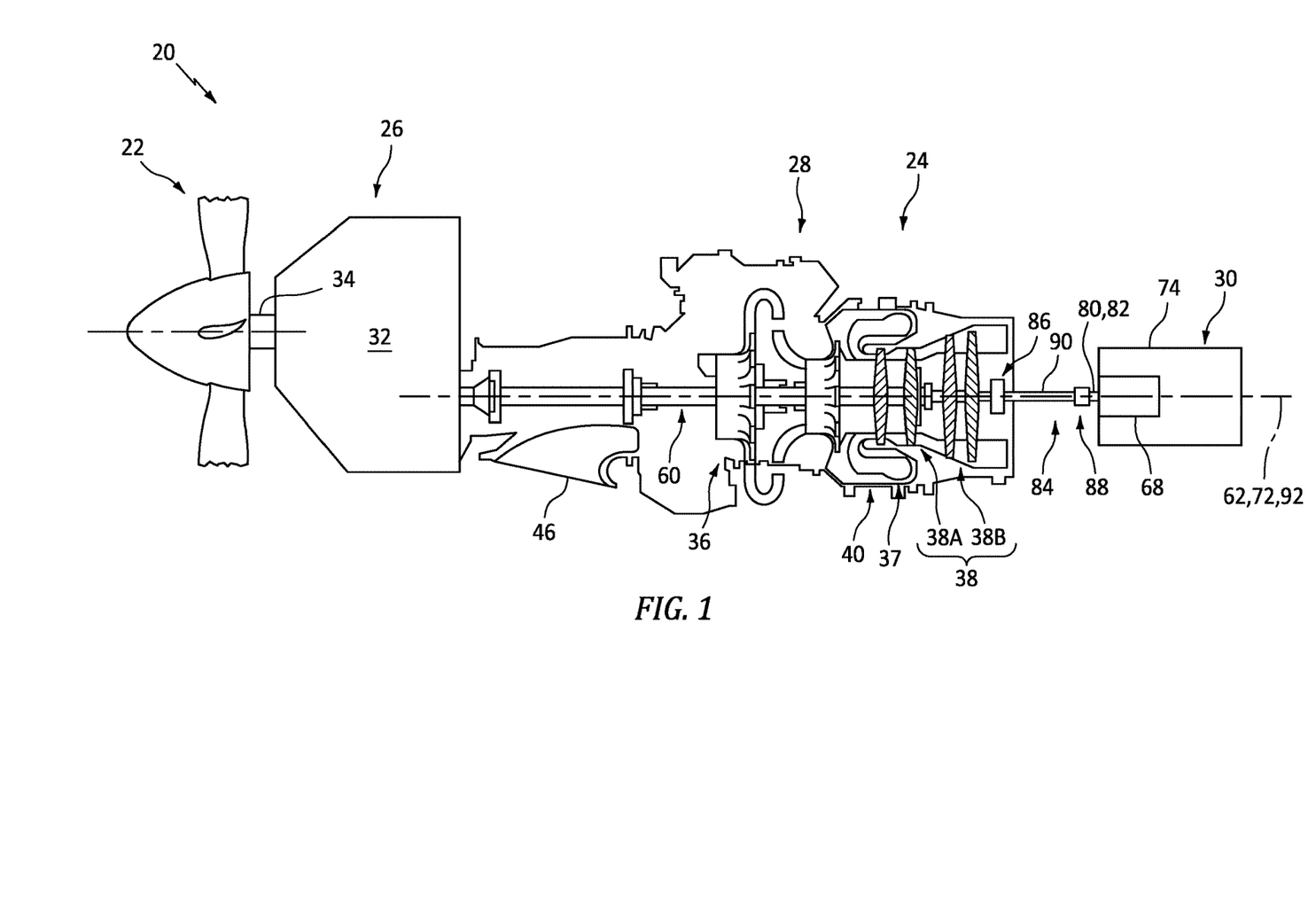
FIG. 1 is a partial schematic sectional illustration of an engine system.

FIG. 1 illustrates an engine system 20 for an aircraft such as an airplane. This engine system 20 may be configured as or otherwise include a propulsion system for the aircraft. The engine system 20 of FIG. 1, for example, includes a propulsor rotor 22 and a hybrid powerplant 24. The engine system 20 of FIG. 1 also includes an external powerplant drivetrain 26 operatively connecting the powerplant 24 with the propulsor rotor 22.

The propulsor rotor 22 may be configured as or otherwise include a bladed rotor. This propulsor rotor 22 may be an open rotor (e.g., an un-ducted rotor) such as a propeller rotor for a propeller propulsion system; e.g., a hybrid turboprop engine. Other examples of the open rotor include a propulsor rotor for a propfan propulsion system or a propulsor rotor for a pusher fan propulsion system. The present disclosure, however, is not limited to such exemplary open rotors nor to open rotor propulsion systems. The propulsor rotor 22, for example, may alternatively be a ducted rotor such as a fan rotor for a turbofan propulsion system; e.g., a hybrid turbofan engine. However, for ease of description, the propulsor rotor 22 may be described and/or referred to herein as the propeller rotor.

The powerplant 24 includes a gas turbine engine 28 and an electric machine 30. The powerplant 24 is configured to drive rotation of the propulsor rotor 22, using the gas turbine engine 28 and/or the electric machine 30, through the external powerplant drivetrain 26. This external powerplant drivetrain 26 may be configured as a geared drivetrain. The external powerplant drivetrain 26 of FIG. 1, for example, includes a geartrain 32 (e.g., a reduction gear system) and a propulsor shaft 34 and/or another power transmission device coupling an output of the geartrain 32 to the propulsor rotor 22. The present disclosure, however, is not limited to such an exemplary geared drivetrain arrangement. Furthermore, in other embodiments, the geartrain 32 may be omitted from the external powerplant drivetrain 26 to provide a direct drive drivetrain between the powerplant 24 and the propulsor rotor 22.

Figure 2:
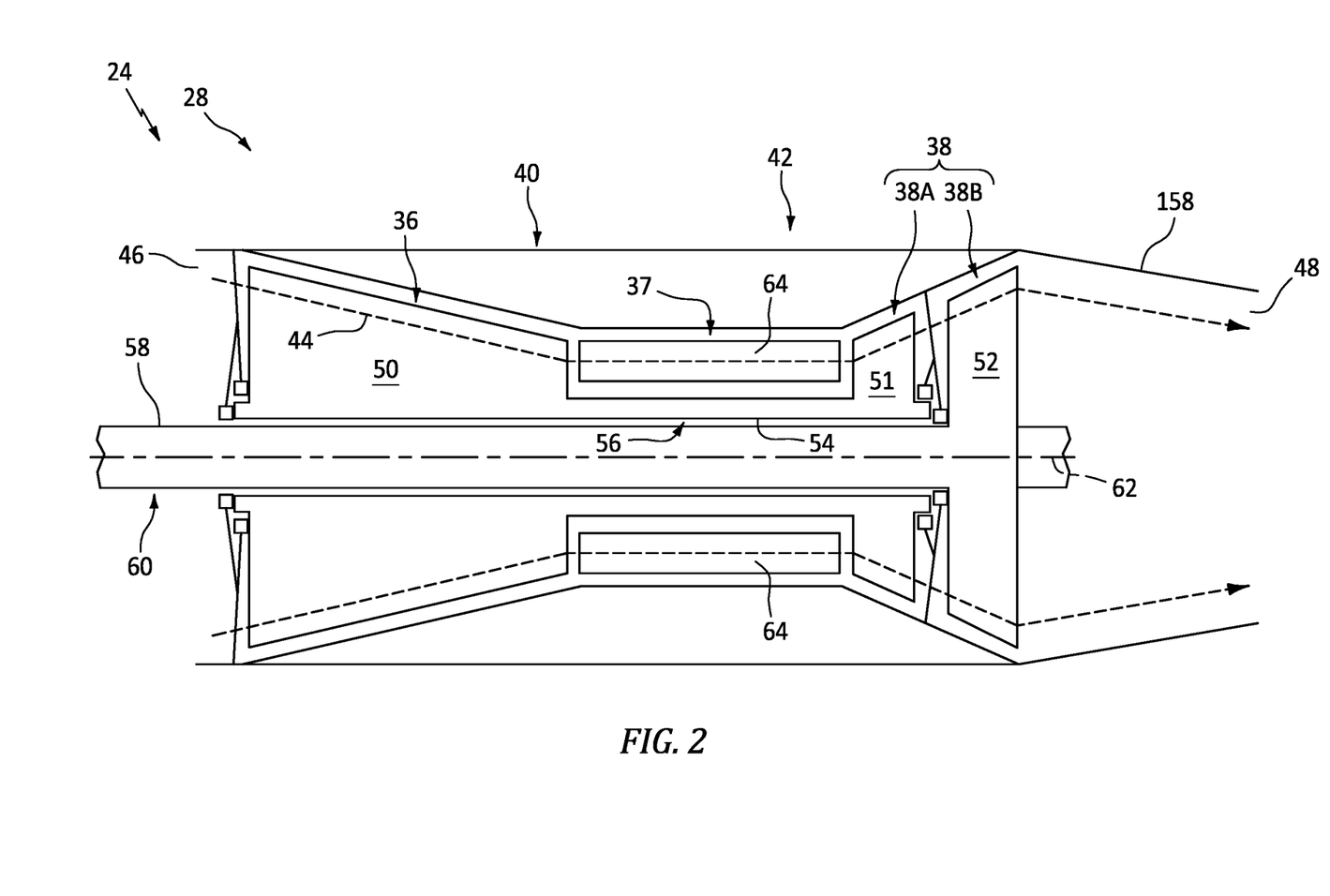
FIG. 2 is a schematic illustration of a gas turbine engine.

Referring to FIG. 2, the gas turbine engine 28 includes a compressor section 36, a combustor section 37 and a turbine section 38. The turbine section 38 may include a high pressure turbine (HPT) section 38A and a low pressure turbine (LPT) section 38B; e.g., a power turbine section. The gas turbine engine 28 also includes an engine case 40 housing the engine sections 36-38B; e.g., a core 42 of the gas turbine engine 28.

The compressor section 36, the combustor section 37, the HPT section 38A and the LPT section 38B are arranged sequentially along a core flowpath 44 (e.g., an annular flowpath) within the gas turbine engine 28. This flowpath 44 extends within the gas turbine engine 28 from an upstream airflow inlet 46 into the gas turbine engine 28 to a downstream combustion products exhaust 48 from the gas turbine engine 28.

Each of the engine sections 36, 38A and 38B includes a respective bladed rotor 50-52. Each of these bladed rotors 50-52 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 50 is connected to the HPT rotor 51 through a high speed shaft 54. At least (or only) the compressor rotor 50, the HPT rotor 51 and the high speed shaft 54 may collectively form a high speed rotating structure 56 of the gas turbine engine 28. The LPT rotor 52 is connected to a low speed shaft 58, which low speed shaft 58 may extend axially through a bore of the high speed rotating structure 56 and its high speed shaft 54. At least (or only) the LPT rotor 52 and the low speed shaft 58 may collectively form a low speed rotating structure 60. This low speed rotating structure 60 may be coupled to and rotatable with the propulsor rotor 22 of FIG. 1 through the external powerplant drivetrain 26 and its member(s) 32 and/or 34.

The engine rotating structures 58 and 60 and their shafts 54 and 58 of FIG. 2 are supported by a plurality of bearings. Each of these bearings is connected to the engine case 40 by one or more support structures; e.g., struts, frames, etc. With this arrangement, each of the engine rotating structures 58, 60 of FIG. 2 is rotatable about a common (or respective) rotational axis 62, which rotational axis 62 may also be an axial centerline of the respective rotating structure 58, 60.

During gas turbine engine operation, air enters the flowpath 44 through the airflow inlet 46 and is directed into the compressor section 36. The air within the flowpath 44 may be referred to as "core air". This core air is compressed by the compressor rotor 50 and directed into a combustion chamber 64 (e.g., an annular chamber) of a combustor within the combustor section 37. The fuel is injected into the combustion chamber 64 by one or more fuel injectors and mixed with the compressed air to provide a fuel-air mixture. This fuel-air mixture is ignited and combustion products thereof flow through and sequentially cause the HPT rotor 51 and the LPT rotor 52 to rotate. The rotation of the HPT rotor 51 drives rotation of the compressor rotor 50 and, thus, compression of the air received from the airflow inlet 46. The rotation of the LPT rotor 52 and, more generally, the low speed rotating structure 60 provides mechanical power for driving (e.g., rotating) the propulsor rotor 22 of FIG. 1.

Figure 3:
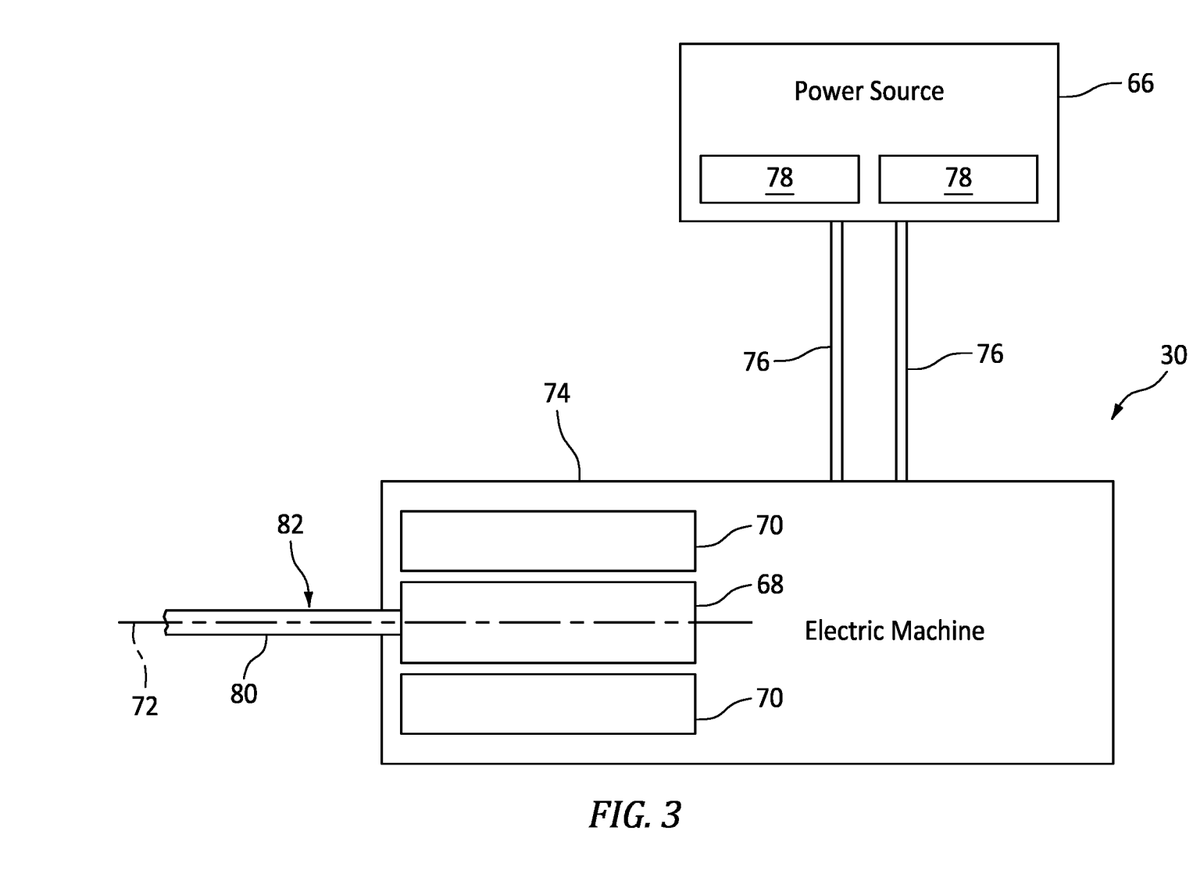
FIG. 3 is a schematic illustration of an electric machine arranged with a power source.

Referring to FIG. 3, the electric machine 30 may be configurable as an electric motor and/or an electric generator. For example, during a motor mode of operation, the electric machine 30 may operate as the electric motor to convert electricity received from a power source 66 into mechanical power. This mechanical power may be utilized for various purposes within the engine system 20 of FIG. 1 such as, for example, rotating the propulsor rotor 22 and/or rotating a rotating structure within the gas turbine engine 28 such as the low speed rotating structure 60 during engine startup. During a generator mode of operation, the electric machine 30 may operate as the electric generator to convert mechanical power received from, for example, the gas turbine engine 28 and its low speed rotating structure 60 into electricity. This electricity may be utilized for various purposes within the engine system 20 such as, for example, electrically powering one or more electric components of the engine system 20 and/or charging the power source 66 (see FIG. 3). The electricity may also or alternatively be utilized for various purposes outside of the engine system 20 such as, for example, electrically powering one or more electric components in the aircraft. Of course, in other embodiments, the electric machine 30 may alternatively be configured as a dedicated electric motor; e.g., without the electric generator functionality.

The electric machine 30 of FIG. 3 includes an electric machine rotor 68 and an (e.g., annular) electric machine stator 70. The machine stator 70 may be radially outboard of and circumscribe the machine rotor 68. The electric machine 30, however, is not limited to such an exemplary rotor-stator configuration. The machine rotor 68, for example, may alternatively be axially next to or radially outboard of and circumscribe the machine stator 70. The machine rotor 68 of FIG. 3 is rotatable about a rotational axis 72 of the machine rotor 68, which rotational axis 72 may also be an axial centerline of the electric machine 30. The electric machine 30 also includes an electric machine case 74 that at least partially or completely houses the machine rotor 68 and the machine stator 70.

The power source 66 is electrically coupled with the electric machine 30 through one or more electrical leads 76; e.g., high voltage lines. The power source 66 is configured to store electricity. The power source 66 is also configured to provide the stored electricity to the electric machine 30 and/or receive electricity from the electric machine 30; e.g., during power source recharging. The power source 66, for example, may be configured as or otherwise include one or more batteries 78 and/or one or more other electric storage devices.

The machine rotor 68 is connected to and rotatable with an electric machine shaft 80. At least (or only) the machine rotor 68 and the machine shaft 80 may collectively form an electric machine rotating structure 82. Referring to FIG. 1, this machine rotating structure 82 may be coupled to and rotatable with one of the engine rotating structures 58, 60 (e.g., the low speed rotating structure 60) through an internal powerplant drivetrain 84. The machine rotating structure 82 may also be coupled to and rotatable with the propulsor rotor 22 (e.g., sequentially) through the internal powerplant drivetrain 84, the low speed rotating structure 60 and the external powerplant drivetrain 26. At least (or only) the internal powerplant drivetrain 84, the low speed rotating structure 60 and the external powerplant drivetrain 26 may collectively form an electric machine drivetrain operatively connecting the electric machine 30 and its machine rotating structure 82 to the propulsor rotor 22.

While the powerplant 24 is non-operational, the rotational axis 72 of the machine rotating structure 82 and its machine rotor 68 of FIG. 1 is coaxial with the rotational axis 62 of the low speed rotating structure 60. The internal powerplant drivetrain 84 may thereby provide a direct drive connection from the machine rotating structure 82 to the low speed rotating structure 60 without, for example, use of a gear system, a tower shaft, etc. However, when the powerplant 24 is operational, the powerplant 24 and one or more of its members 28 and 30 may be subject to vibrations, thermal gradients and other dynamic loads. Such dynamic loads may cause the electric machine 30 to shift (e.g., slightly move) relative to the gas turbine engine 28. For example, the machine rotating structure 82 and the low speed rotating structure 60 may move axially towards and/or away from one another. The machine rotating structure 82 and the low speed rotating structure 60 may also or alternatively become misaligned. For example, the rotational axis 72 of the machine rotating structure 82 may become (e.g., momentarily) radially offset from the rotational axis 62 of the low speed rotating structure 60. The rotational axis 72 of the machine rotating structure 82 may also or alternatively become (e.g., momentarily) skewed (e.g., angularly offset) from the rotational axis 62 of the low speed rotating structure 60.

Figure 4:
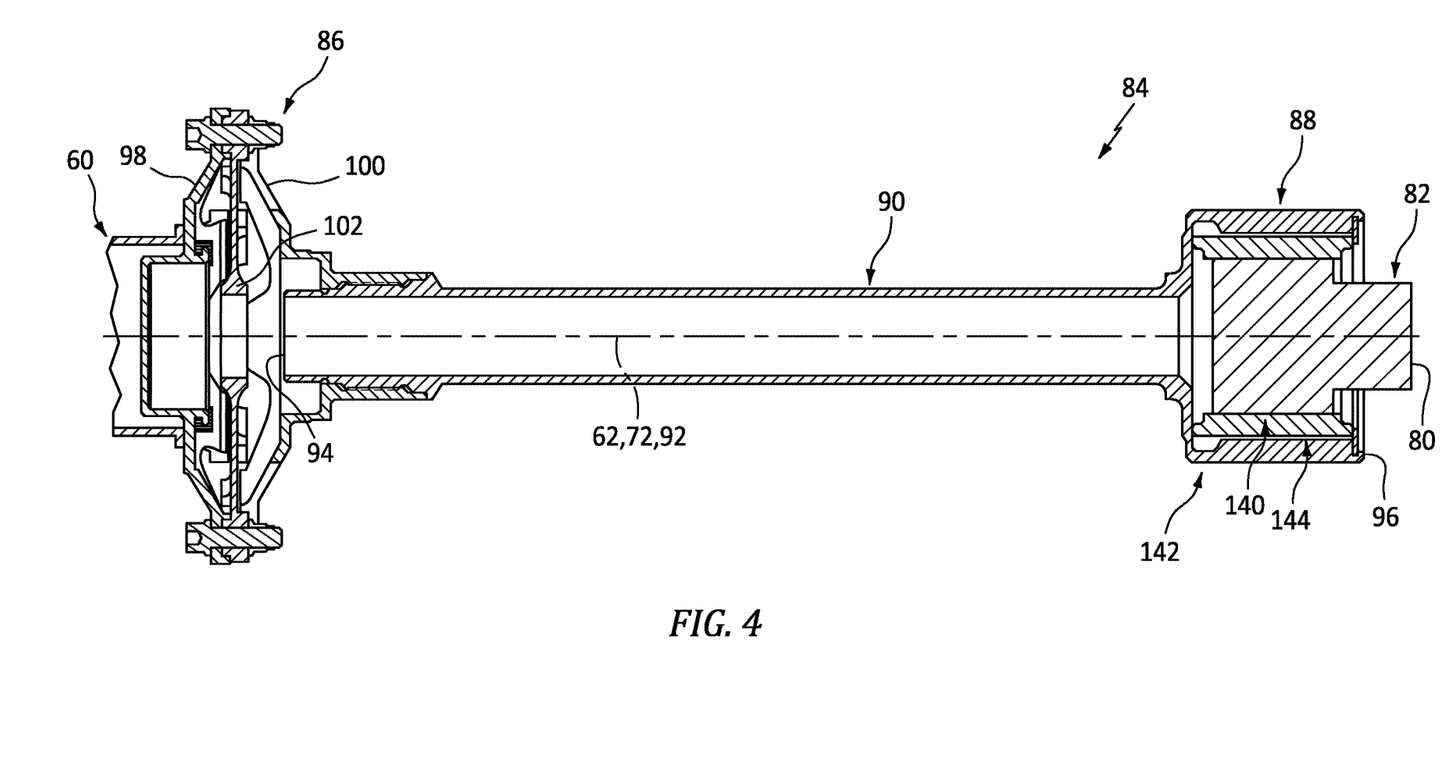
FIG. 4 is a sectional illustration of a drivetrain for rotatably connecting an electric machine rotating structure to a gas turbine engine rotating structure.

To accommodate axial shifting and/or misalignment between the rotating structures 60 and 82 and their axes 62 and 72, the internal powerplant drivetrain 84 of FIG. 4 is configured to flex and/or otherwise deform and thereby facilitate (e.g., slight) movement between the rotating structures 60 and 82. The internal powerplant drivetrain 84 of FIG. 4, for example, includes one or more flex couplers 86 and 88 (e.g., flexible joints) and an intermediate shaft 90; e.g., a fixed length shaft. The engine flex coupler 86 of FIG. 4 is connected to the low speed rotating structure 60. The machine flex coupler 88 is connected to the machine rotating structure 82. The intermediate shaft 90 is arranged and extends axially between the engine flex coupler 86 and the machine flex coupler 86. The intermediate shaft 90 extends axially along a rotational axis 92 of the intermediate shaft 90 between and to an engine-side end 94 of the intermediate shaft 90 and a machine-side end 96 of the intermediate shaft 90, which rotational axis 92 is coaxial with the axes when the powerplant 24 is non-operational. The intermediate shaft 90 is connected to the engine flex coupler 86 at its engine-side end 94. The intermediate shaft 90 is connected to the machine flex coupler 88 at its machine-side end 96.

Figure 5:
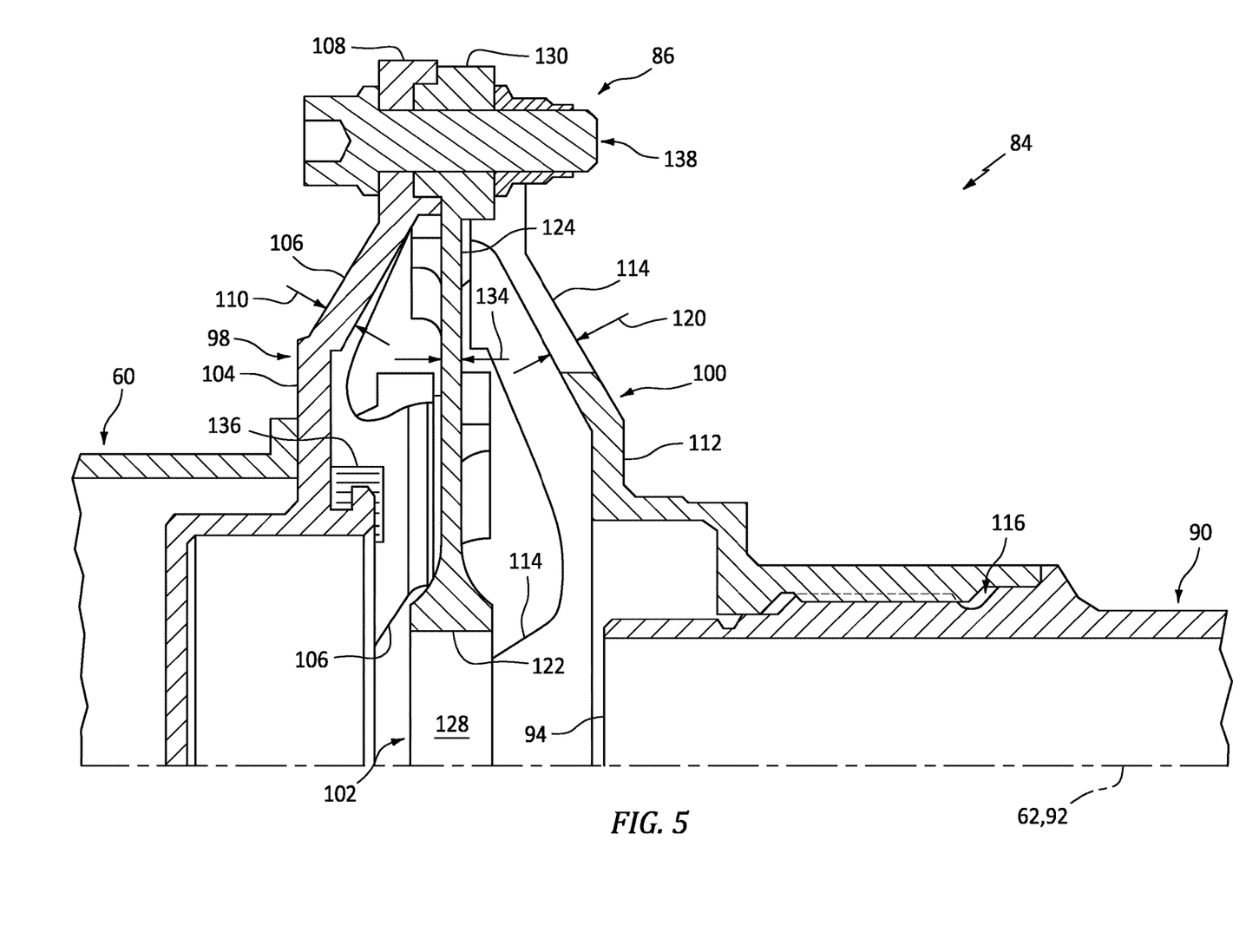
FIG. 5 is a partial sectional illustration of a flex coupling between the engine rotating structure and a drivetrain shaft.
Figure 6:
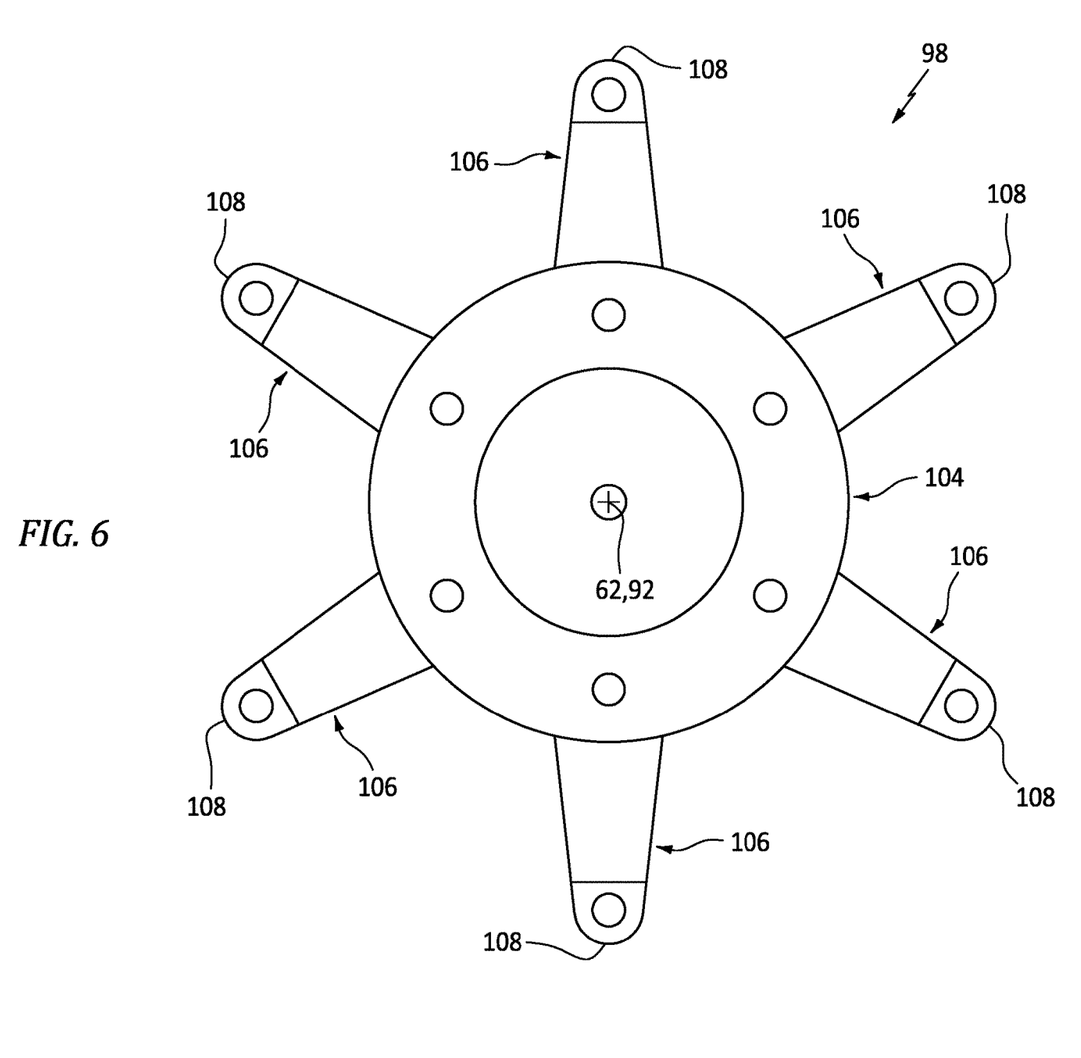
FIG. 6 is an illustration of a first mount for the flex coupling of FIG. 5.

Referring to FIG. 5, the engine flex coupler 86 includes a first mount 98, a second mount 100 and a flex plate 102. Referring to FIG. 6, the first mount 98 includes a first mount base 104 ("first base") and a plurality of first mount fingers 106 ("first fingers"). The first base 104 extends circumferentially about (e.g., completely around) the axis 62, 92. The first base 104 projects radially out to an outer periphery of the first base 104.

The first fingers 106 are arranged circumferentially about the axis 62, 92 and the first base 104 in an array. Each of the first fingers 106 may be configured as or otherwise include a tab, a flange and/or any other type of protrusion from the first base 104. Each first finger 106 of FIG. 6, for example, is connected to (e.g., formed integral with) the first base 104. Each first finger 106 projects out from the first base 104 in a radial outward direction (away from the axis 62, 92) to a distal end 108 of the respective first finger 106. Referring to FIG. 5, at least a (e.g., inner, base) portion of each first finger 106 may also project out from the first base 104 in an axial direction (towards the engine flex coupler members 100 and/or 102) towards the respective first finger distal end 108. Each first finger 106 has a minimum thickness 110 when viewed, for example, in a reference plane parallel with (e.g., including) the axis 62, 92.

Figure 7:
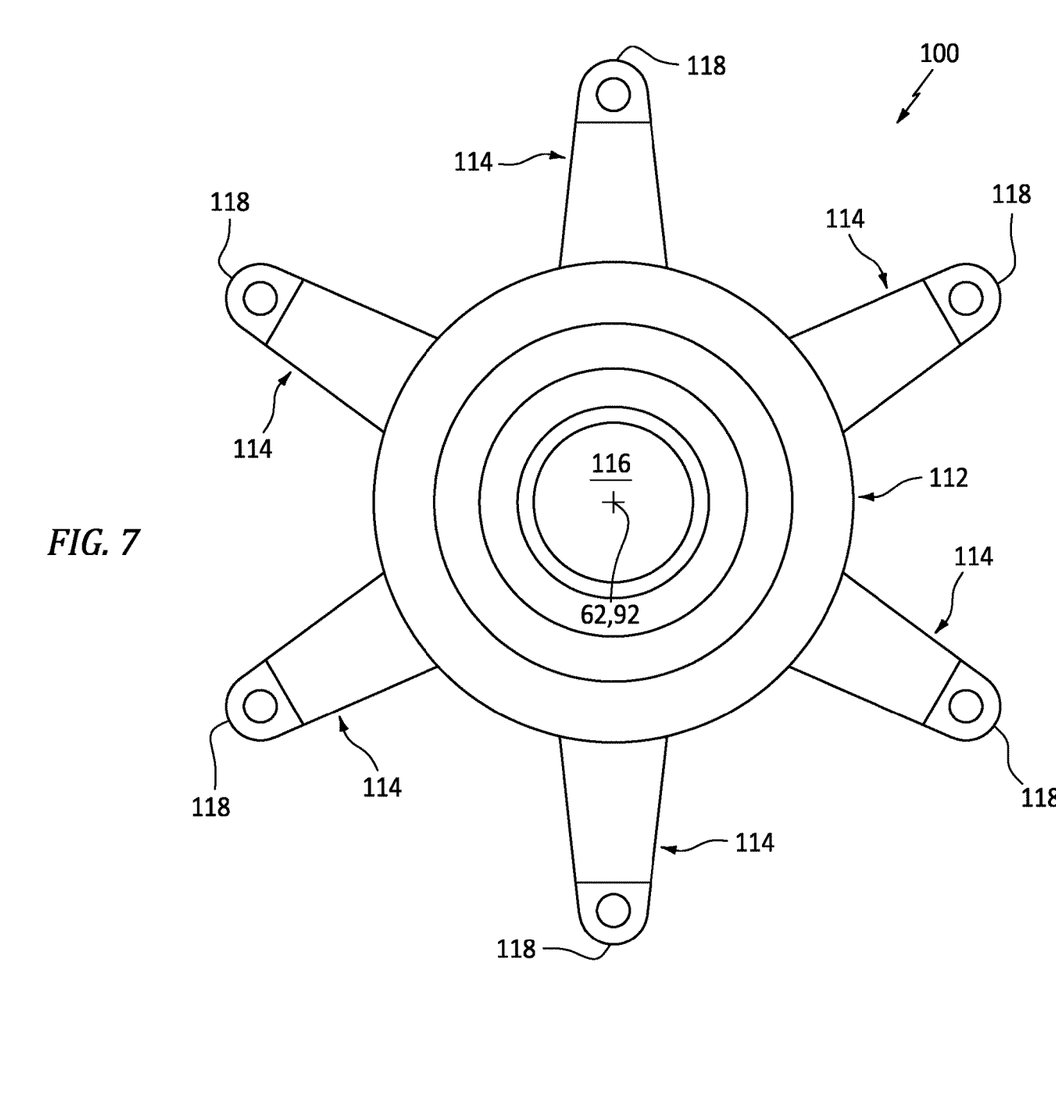
FIG. 7 is an illustration of a second mount for the flex coupling of FIG. 5.

Referring to FIG. 7, the second mount 100 includes a second mount base 112 ("second base") and a plurality of second mount fingers 114 ("second finger"). The second base 112 extends circumferentially about (e.g., completely around) the axis 62, 92. The second base 112 extends radially from an inner periphery of the second base 112 to an outer periphery of the second base 112, where the second base inner periphery forms an inner bore 116 axially through (or alternatively into) the second mount 100.

The second fingers 114 are arranged circumferentially about the axis 62, 92 and the second base 112 in an array. Each of the second fingers 114 may be configured as or otherwise include a tab, a flange and/or any other type of protrusion from the second base 112. Each second finger 114 of FIG. 7, for example, is connected to (e.g., formed integral with) the second base 112. Each second finger 114 projects out from the second base 112 in a radial outward direction (away from the axis 62, 92) to a distal end 118 of the respective second finger 114. Referring to FIG. 5, at least a (e.g., inner, base) portion of each second finger 114 may also project out from the second base 112 in an axial direction (towards the engine flex coupler members 98 and/or 102) towards the respective second finger distal end 118. Each second finger 114 has a minimum thickness 120 when viewed, for example, in the reference plane. The second finger thickness 120 may be equal to (or different than) the first finger thickness 110.

Figure 8:
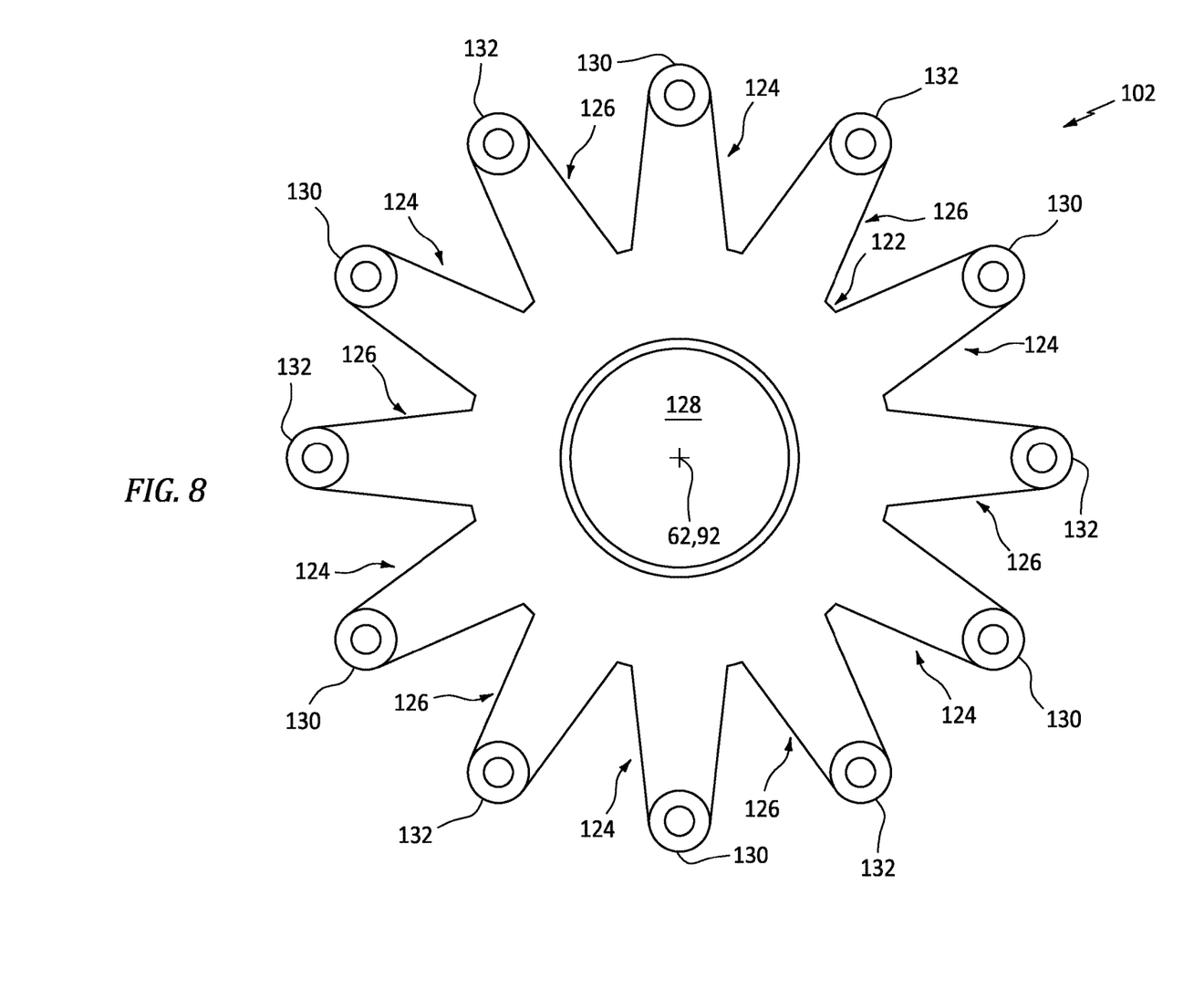
FIG. 8 is an illustration of a flex plate for the flex coupling of FIG. 5.

Referring to FIG. 8, the flex plate 102 includes a flex plate base 122 ("flex base"), a plurality of first flex plate fingers 124 ("first flex fingers") and a plurality of second flex plate fingers 126 ("second flex fingers"). The flex base 122 extends circumferentially about (e.g., completely around) the axis 62, 92. The flex base 122 extends radially from an inner periphery of the flex base 122 to an outer periphery of the flex base 122, where the flex base inner periphery forms an inner bore 128 axially through (or alternatively into) the flex plate 102.

The first flex fingers 124 are arranged circumferentially about the axis 62, 92 and the flex base 122 in an array. Each of the first flex fingers 124 may be configured as or otherwise include a tab, a flange and/or any other type of protrusion from the flex base 122. Each first flex finger 124 of FIG. 8, for example, is connected to (e.g., formed integral with) the flex base 122. Each first flex finger 124 projects out from the flex base 122 in a radial outward direction (away from the axis 62, 92) to a distal end 130 of the respective first flex finger 124.

The second flex fingers 126 are arranged circumferentially about the axis 62, 92 and the flex base 122 in an array. Each of the second flex fingers 126 may be configured as or otherwise include a tab, a flange and/or any other type of protrusion from the flex base 122. Each second flex finger 126 of FIG. 8, for example, is connected to (e.g., formed integral with) the flex base 122. Each second flex finger 126 projects out from the flex base 122 in a radial outward direction (away from the axis 62, 92) to a distal end 132 of the respective second flex finger 126.

The first flex fingers 124 are interspersed with the second flex fingers 126 circumferentially about the axis 62, 92. Each first flex finger 124 of FIG. 8, for example, is arranged circumferentially (e.g., midway) between a respective circumferentially adjacent (e.g., neighboring) pair of the second flex fingers 126. Each second flex finger 126 of FIG. 8 is arranged circumferentially (e.g., midway) between a respective circumferentially adjacent pair of the first flex fingers 124. Referring to FIG. 5, each of the flex fingers 124, 126 has a minimum thickness 134 when viewed, for example, in the reference plane. The flex finger thickness 134 may be smaller than the first finger thickness 110 and/or the second finger thickness 120. With such an arrangement, the flex fingers 124 and 126 are configured to flex (e.g., bend and/or otherwise deform) while the other fingers 106 and/or 114 may (or may not) remain stiff/rigid. The present disclosure, however, is not limited to such an exemplary relative sizing between the fingers. Furthermore, while the first flex fingers 124 and the second flex fingers 126 are described as having a common (the same) thickness, the first flex fingers 124 may alternatively have a different (e.g., larger or smaller) thickness than the second flex fingers 126 in other embodiments.

The first mount 98 is connected to the low speed rotating structure 60. The low speed rotating structure 60 of FIG. 5, for example, is mechanically fastened to the first mount 98 and its first base 104 via, for example, one or more fasteners 136 (e.g., bolts and nuts). The second mount 100 is connected to the intermediate shaft 90 at its engine-side end 94. The intermediate shaft 90 of FIG. 5, for example, is mated with (e.g., nested into, threaded into, etc.) the second mount 100 and its second base 112. Each of the first flex fingers 124 is circumferentially aligned with and axially engages (e.g., abutted against) a respective one of the first fingers 106. Each first flex finger 124 is connected to the respective first finger 106. Each first flex finger 124 of FIG. 5, for example, is mechanically fastened to the respective first finger 106 via, for example, a fastener 138 (e.g., a bolt and a nut). Each of the second flex fingers 126 (see FIG. 8) is circumferentially aligned with and axially engages (e.g., abutted against) a respective one of the second fingers 114 (see FIG. 7). Each second flex finger 126 is connected to the respective second finger 114. Each second flex finger 126, for example, may be mechanically fastened to the respective second finger 114 via, for example, a fastener (e.g., a bolt and a nut) as shown with respect to the fingers 106 and 124. With this arrangement, the flex plate 102 flexibly connects the first mount 98 to the second mount 100.

The engine flex coupler 86 of FIG. 5 is configured to accommodate axial shifting and/or misalignment between the low speed rotating structure 60 and the intermediate shaft 90. One or more or all of the flex fingers 124 and 126 (see FIG. 8) (and/or the other fingers 106 and/or 114), for example, may independently flex (e.g., bend and/or otherwise deform) in various directions to facilitate axial shifting between the mount bases 104 and 112 and/or misalignment between the mount bases 104 and 112.

Figure 9:
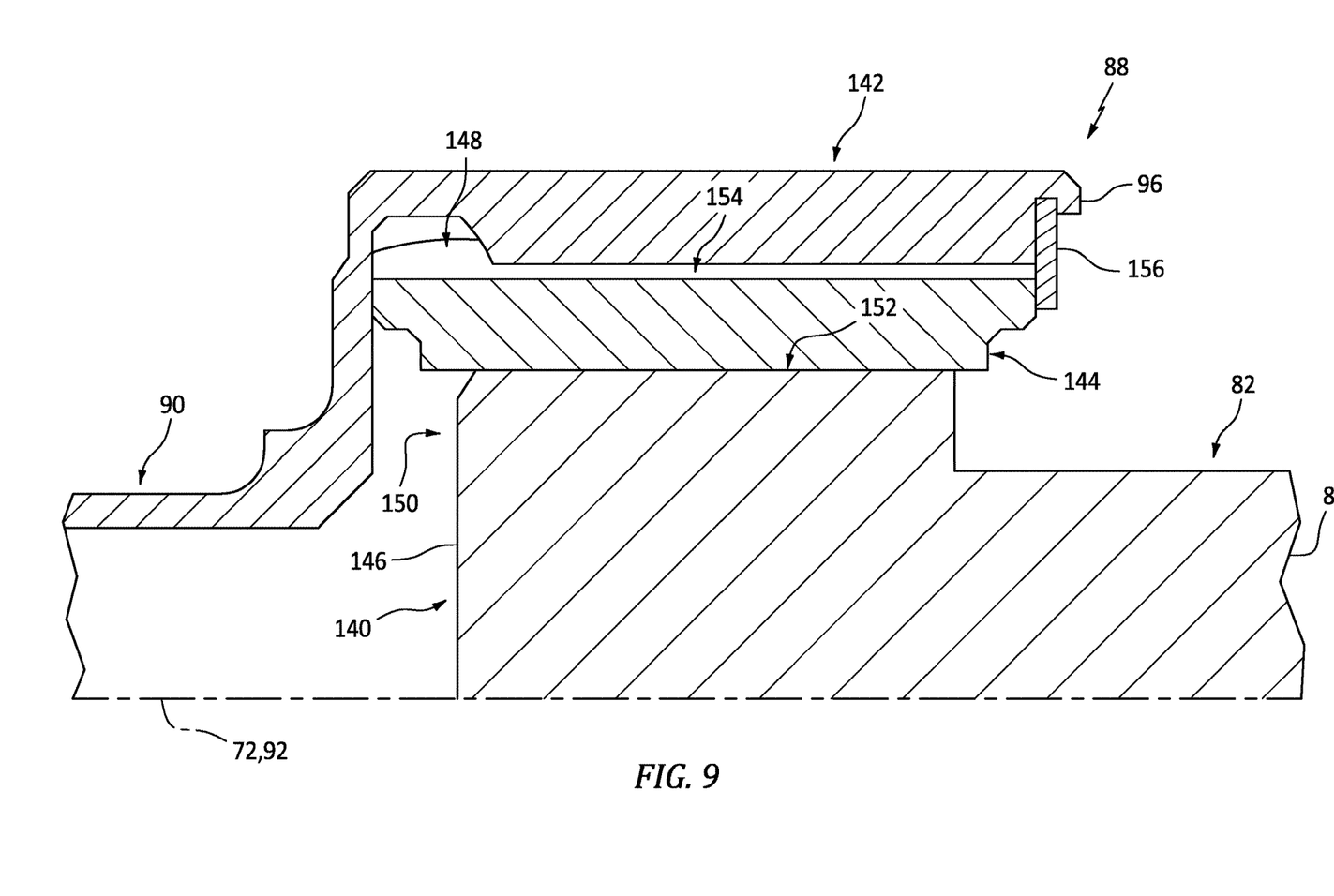
FIG. 9 is a partial sectional illustration of a flex coupling between the machine rotating structure and the drivetrain shaft.
Figure 10:
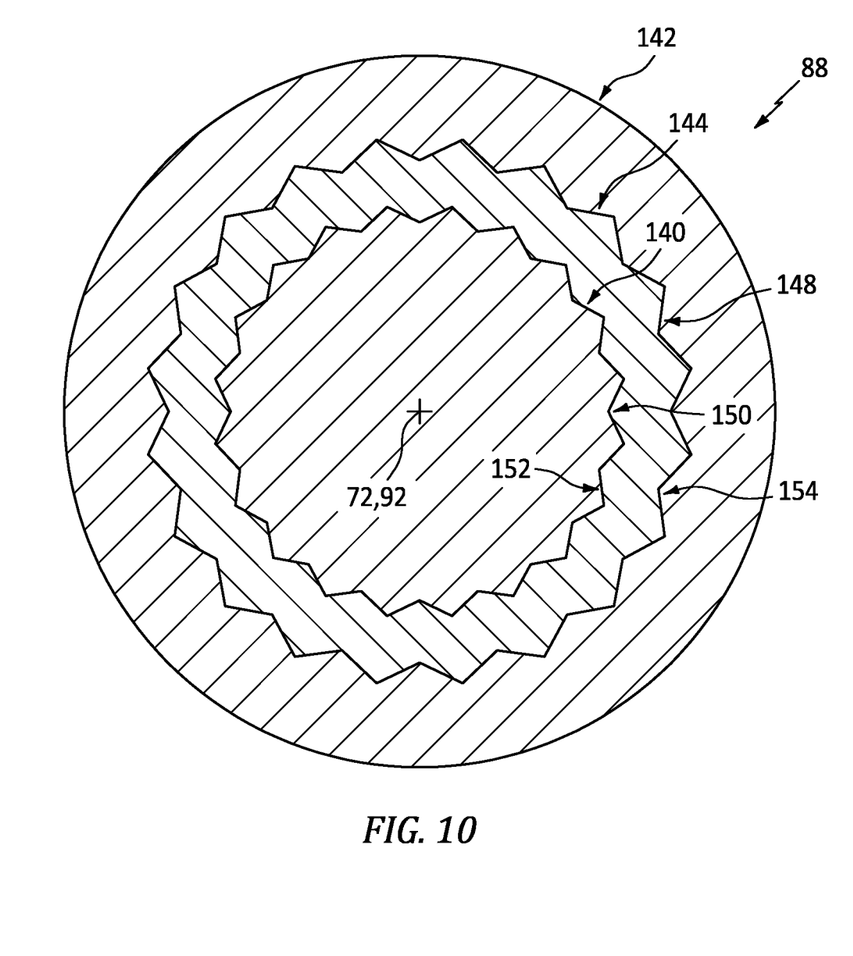
FIG. 10 is a cross-sectional illustration of the flex coupling of FIG. 9.

Referring to FIG. 9, the machine flex coupler 88 includes a hub 140, a sleeve 142 and a polymer coupler 144. The hub 140 is connected to the machine rotating structure 82. The hub 140 of FIG. 9, for example, is formed integral with (or may be otherwise attached to) the machine shaft 80 at (e.g., on, adjacent or proximate) an axial end 146 of the machine shaft 80. Referring to FIG. 10, the hub 140 extends circumferentially about (e.g., completely around) the axis 72, 92. The hub 140 projects radially out (e.g., from the machine shaft 80) to an outer periphery of the hub 140.

Referring to FIG. 9, the sleeve 142 is connected to the intermediate shaft 90. The sleeve 142 of FIG. 9, for example, is formed integral with (or may be otherwise attached to) the intermediate shaft 90 at the machine-side end 96 of the intermediate shaft 90. Referring to FIG. 10, the sleeve 142 extends circumferentially about (e.g., completely around) the axis 72, 92; e.g., circumscribing the hub 140 and the polymer coupler 144. The sleeve 142 extends radially from an inner periphery of the sleeve 142 to an outer periphery of the sleeve 142, where the sleeve inner periphery forms an inner receptacle 148 axially into the intermediate shaft 90. This receptacle 148 is configured to receive the hub 140 and the polymer coupler 144; see also FIG. 9.

The polymer coupler 144 is inserted into the receptacle 148 and arranged radially between the hub 140 and the sleeve 142. The polymer coupler 144 extends circumferentially about (e.g., completely around) the axis 72, 92; e.g., circumscribing the hub 140. The polymer coupler 144 extends radially from an inner periphery of the polymer coupler 144 to an outer periphery of the polymer coupler 144, where the polymer coupler inner periphery forms an inner bore 150 axially through the polymer coupler 144 which receives the hub 140. The polymer coupler 144 radially engages the hub 140 and the sleeve 142. The polymer coupler 144, for example, may be rotationally fixed to the hub 140 at the coupler inner periphery by, for example, an inner meshed interface 152. This inner meshed interface 152 may be a splined interface, a toothed interface or another keyed interface. The polymer coupler 144 may be rotationally fixed to the sleeve 142 at the coupler outer periphery by, for example, an outer meshed interface 154. This outer meshed interface 154 may be a splined interface, a toothed interface or another keyed interface. Referring to FIG. 9, the polymer coupler 144 may also be axially fixed to the sleeve 142 by, for example, a retaining ring 156.

With the foregoing arrangement, the polymer coupler 144 rotationally connects the hub 140 to the sleeve 142 while allowing axial translation between the hub 140 and the polymer coupler 144. The polymer coupler 144 may also be relatively compliant and thereby facilitate (e.g., slight) misalignment between the hub 140 and the sleeve 142. The polymer coupler 144, for example, may be constructed from or otherwise include a relatively compliant polymer (relative to metal) such as, but not limited to, Vespel® material manufactured by DuPont.

In some embodiments, referring to FIG. 4, the flex couplers 86 and 88 may be provided with different configurations. The flex coupler 86, for example, may rotatably connect the low speed rotating structure 60 to the intermediate shaft 90 while the flex coupler 88 may rotatably connect the machine rotating structure 82 to the intermediate shaft 90 as described above. With such an arrangement, the intermediate shaft 90 may be coupled to the low speed rotating structure 60 before installing the electric machine 30, which may be useful where an exhaust duct 158 (see FIG. 2) may otherwise block access to the engine flex coupler location after installation of the electric machine 30. The electric machine 30 may then be installed and the intermediate shaft 90 may be rotatably connected to the machine rotating structure 82 by axially translating the hub 140 and inserting it into the polymer coupler 144. Of course, in other embodiments, the arrangement of the flex couplers 86 and 88 may be reversed such that the flex coupler 88 rotatably connects the low speed rotating structure 60 to the intermediate shaft 90 and the flex coupler 86 rotatably connects the machine rotating structure 82 to the intermediate shaft 90. Furthermore, in still other embodiments, the flex couplers 86 and 88 may be provided with a common (the same) configuration. Each of the flex couplers 86 and 88, for example, may be configured with the configuration of the flex coupler 86 of FIG. 5.

The gas turbine engine 28 may have various configurations other than the exemplary one described above. The low speed rotating structure 60, for example, may include a compressor rotor; e.g., a low pressure compressor (LPC) rotor. In another example, the low speed rotating structure 60 may be omitted and the high speed rotating structure 56 may be configured for providing the mechanical power for driving the propulsor rotor 22 of FIG. 1. In such embodiments, the machine rotating structure 82 may be operatively connected to the propulsor rotor 22 through the high speed rotating structure 56; e.g., a single rotating structure (e.g., spool) of the gas turbine engine 28. In still another example, the gas turbine engine 28 may include one or more additional (e.g., intermediate) rotating structures. The present disclosure is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and embodiments and remain within the scope of the disclosure. Accordingly, the present disclosure is not to be restricted except in light of the attached claims and their equivalents.

What is claimed is:

1. An engine system, comprising:
a gas turbine engine including an engine rotating structure, a compressor section, a combustor section, a turbine section and a flowpath extending through the compressor section, the combustor section and the turbine section, the engine rotating structure comprising a turbine rotor within the turbine section;
an electric machine comprising an electric machine rotating structure; and
a flex coupler rotatably connecting the electric machine rotating structure to the engine rotating structure, the flex coupler including
a first mount including a plurality of first mount fingers arranged circumferentially about an axis;
a second mount including a plurality of second mount fingers arranged circumferentially about the axis; and
a flex plate connecting the first mount to the second mount, the flex plate including a plurality of first flex plate fingers and a plurality of second flex plate fingers, each of the plurality of first flex plate fingers attached to a respective one of the plurality of first mount fingers, and each of the plurality of second flex plate fingers attached to a respective one of the plurality of second mount fingers.

2. The engine system of claim 1, wherein the flex coupler is configured to accommodate axial shifting between the engine rotating structure and the electric machine rotating structure.

3. The engine system of claim 1, wherein the flex coupler is configured to accommodate misalignment between a rotational axis of the engine rotating structure and a rotational axis of the electric machine rotating structure.

4. The engine system of claim 1, wherein the plurality of first flex plate fingers are interspersed with the plurality of second flex plate fingers circumferentially about the axis.

5. The engine system of claim 1, wherein each of the plurality of first flex plate fingers is arranged circumferentially between a respective circumferentially adjacent pair of the plurality of second flex plate fingers.

6. The engine system of claim 5, wherein each of the plurality of second flex plate fingers is arranged circumferentially between a respective circumferentially adjacent pair of the plurality of first flex plate fingers.

7. The engine system of claim 1, wherein
the first mount further includes a first mount base;
each of the plurality of first mount fingers projects radially out from the first mount base to a respective first mount finger distal end; and
each of the plurality of first mount fingers is attached to the respective one of the plurality of first flex plate fingers at the respective first mount finger distal end.

8. The engine system of claim 7, wherein each of the plurality of first mount fingers further projects axially out from the first mount base towards the respective first mount finger distal end.

9. The engine system of claim 1, wherein
the flex plate further includes a flex plate base;
each of the plurality of first flex plate fingers projects radially out from the flex plate base to a respective first flex plate finger distal end, and each of the plurality of first flex plate fingers is attached to the respective one of the plurality of first mount fingers at the respective first flex plate finger distal end; and
each of the plurality of second flex plate fingers projects radially out from the flex plate base to a respective second flex plate finger distal end, and each of the plurality of second flex plate fingers is attached to the respective one of the plurality of second mount fingers at the respective second flex plate finger distal end.

10. The engine system of claim 1, wherein
each of the plurality of first mount fingers has a minimum first mount finger thickness; and
each of the plurality of first flex plate fingers has a minimum first flex plate finger thickness that is less than the minimum first mount finger thickness.

11. The engine system of claim 1, wherein
each of the plurality of first flex plate fingers is attached to the respective one of the plurality of first mount fingers by a respective first fastener; and
each of the plurality of second flex plate fingers attached to the respective one of the plurality of second mount fingers by a respective second fastener.

12. The engine system of claim 1, further comprising a driveshaft rotatably connecting the flex coupler to one of the electric machine rotating structure or the engine rotating structure.

13. The engine system of claim 12, further comprising:
a second flex coupler rotatably connecting the driveshaft to the electric machine rotating structure;
the flex coupler comprising a first flex coupler that rotatably connects the driveshaft to the engine rotating structure; and
the second flex coupler having a different configuration than the first flex coupler.

14. The engine system of claim 12, further comprising:
a second flex coupler rotatably connecting the driveshaft to the electric machine rotating structure;
the flex coupler comprising a first flex coupler that rotatably connects the driveshaft to the engine rotating structure; and
the second flex coupler having a common configuration with the first flex coupler.

15. The engine system of claim 1, wherein the flex coupler is directly attached to at least one of the engine rotating structure or the electric machine rotating structure.

16. The engine system of claim 1, further comprising a propulsor rotor rotatably connected to the engine rotating structure and the electric machine rotating structure.

17. An engine system, comprising:
a propulsor rotor;
an electric machine comprising an electric machine rotating structure; and
a drivetrain configured to transfer mechanical power between the electric machine rotating structure and the propulsor rotor, the drivetrain comprising a flex coupler including
a first mount including a plurality of first mount fingers arranged circumferentially about an axis;
a second mount including a plurality of second mount fingers arranged circumferentially about the axis; and
a flex plate connecting the first mount to the second mount, the flex plate including a plurality of first flex plate fingers and a plurality of second flex plate fingers, each of the plurality of first flex plate fingers attached to a respective one of the plurality of first mount fingers, and each of the plurality of second flex plate fingers attached to a respective one of the plurality of second mount fingers.

18. The engine system of claim 17, further comprising:
a gas turbine engine comprising an engine rotating structure;
the drivetrain rotatably connecting the electric machine rotating structure to the engine rotating structure.

* * * * *